June 21, 1927.
C. E. ROSS
1,632,855
NUT TAPPING MACHINE
Filed May 29, 1922
4 Sheets-Sheet 1
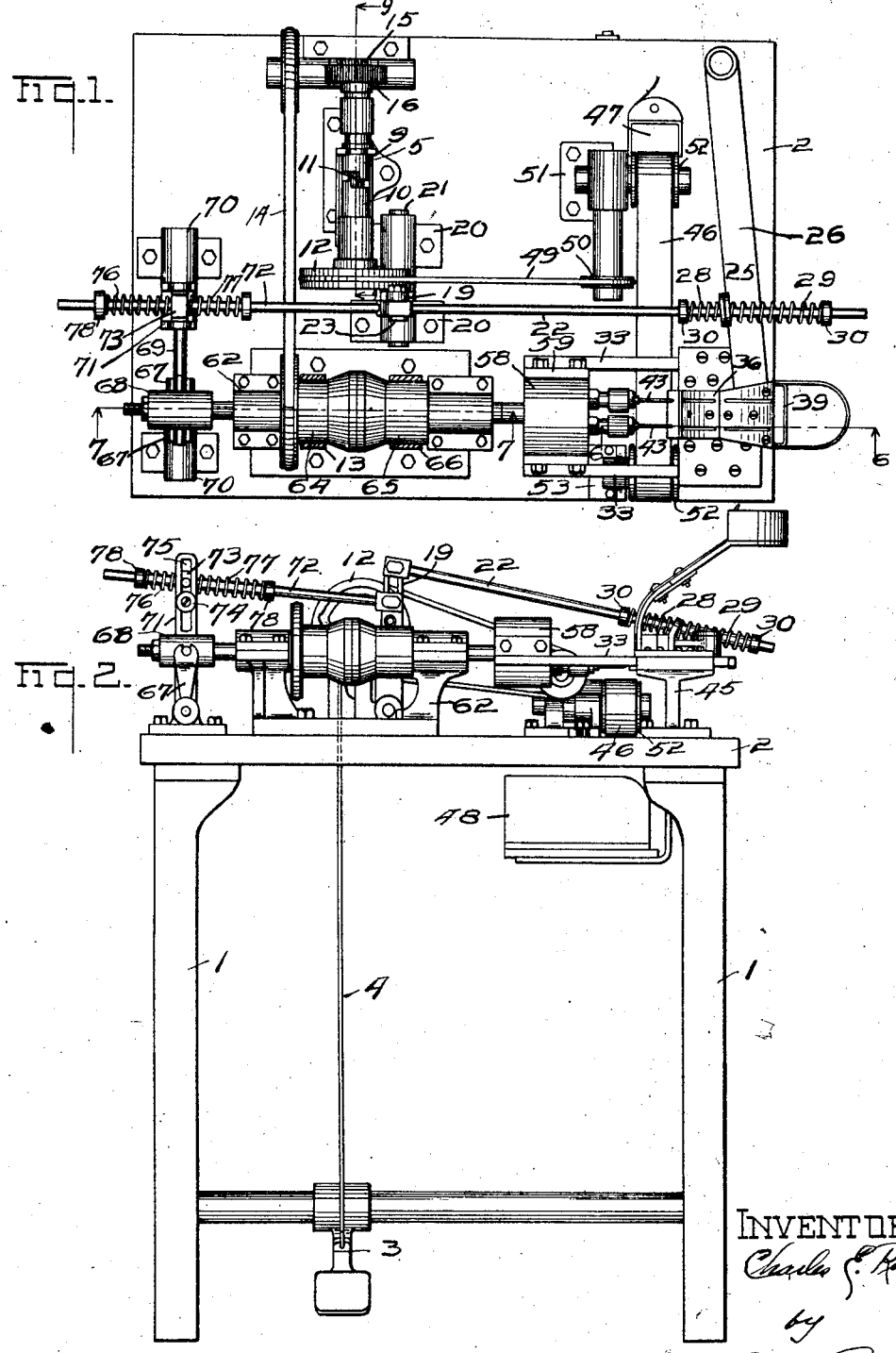
INVENTOR
Charles E. Ross
by
Owen, Owen & Crampton Inventor
Charles E. Ross June 21, 1927.
C. E. ROSS
1,632,855
NUT TAPPING MACHINE
Filed May 29, 1922
4 Sheets-Sheet 3
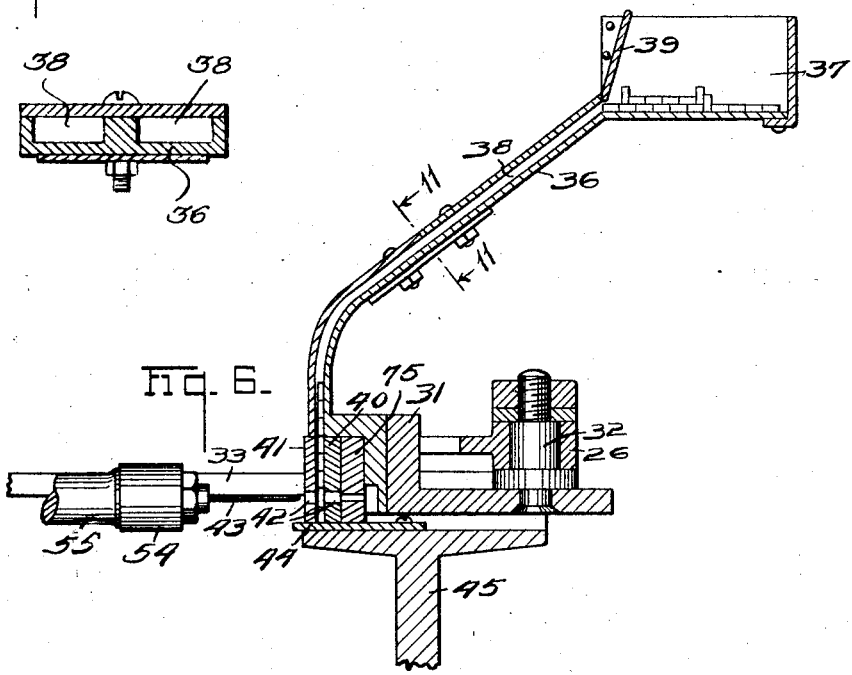
INVENTOR
Charles E. Ross
by
Owen Owen & Crompton June 21, 1927.
C. E. ROSS
1,632,855
NUT TAPPING MACHINE
Filed May 29, 1922
4 Sheets-Sheet 4
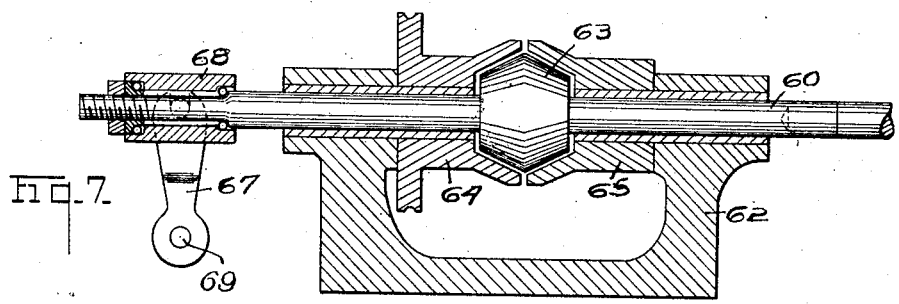
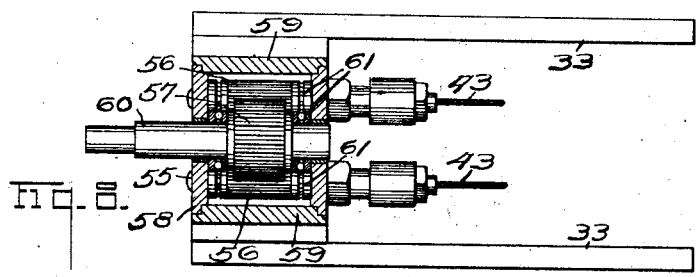
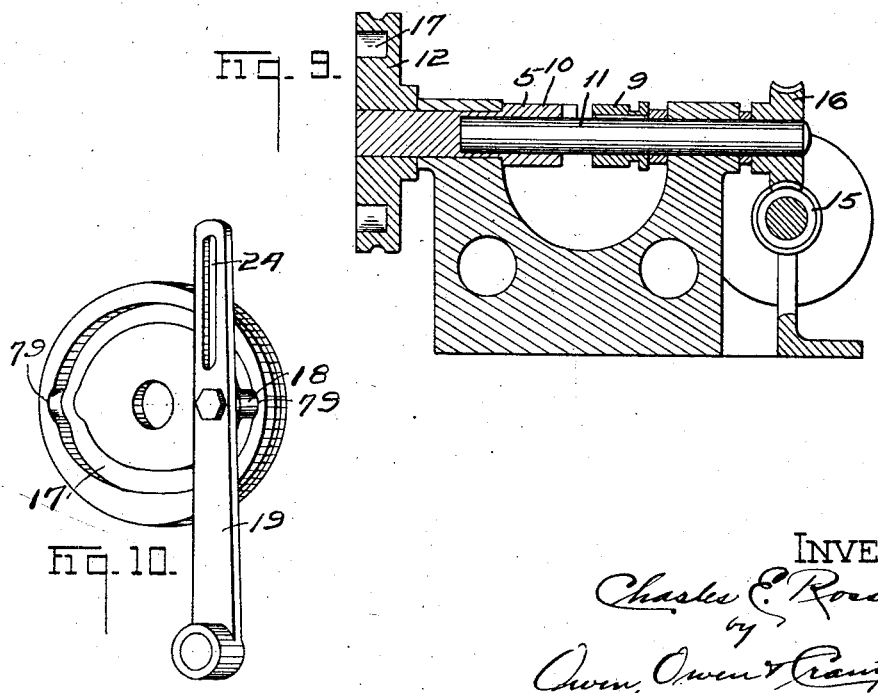
INVENTOR
Charles E. Ross,
by
Owen, Owen & Crampton.

Patented June 21, 1927.

1,632,855

UNITED STATES PATENT OFFICE.

CHARLES E. ROSS, OF AMSTERDAM, NEW YORK, ASSIGNOR TO THE COLLETTE MANUFACTURING COMPANY, OF AMSTERDAM, NEW YORK, A CORPORATION OF NEW YORK.

NUT-TAPPING MACHINE.

Application filed May 29, 1922. Serial No. 564,421.

My invention has for its object to provide an efficient and rapid nut tapping machine. The invention provides a means for feeding the nuts into position before taps and removing the nuts from this position. It provides means whereby the nuts are fed to and removed from the tapping position without jamming the nuts or the taps. It also provides compensating parts whereby assured and uniform action is obtained in the machine, and particularly in the nut tapping mechanism.

The invention has for its object to produce other features and attain other advantages that will appear from the following description and upon examination of the drawings forming a part of this application.

The invention may be contained in structures of different forms. To illustrate a practical application of the invention I have selected one of the structures containing the invention and shall describe it hereinafter. The structure selected is illustrated in the accompanying drawings.

Figure 3:
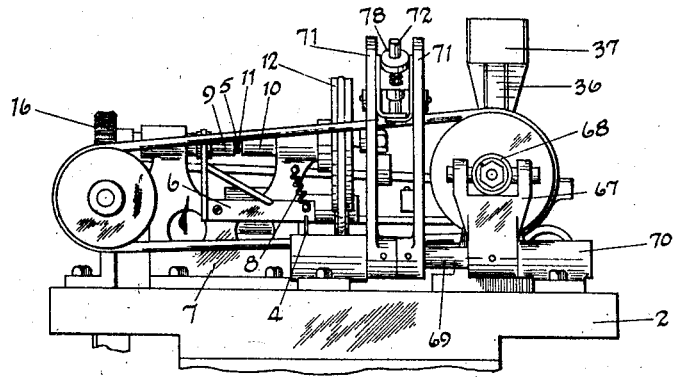
Figure 4:
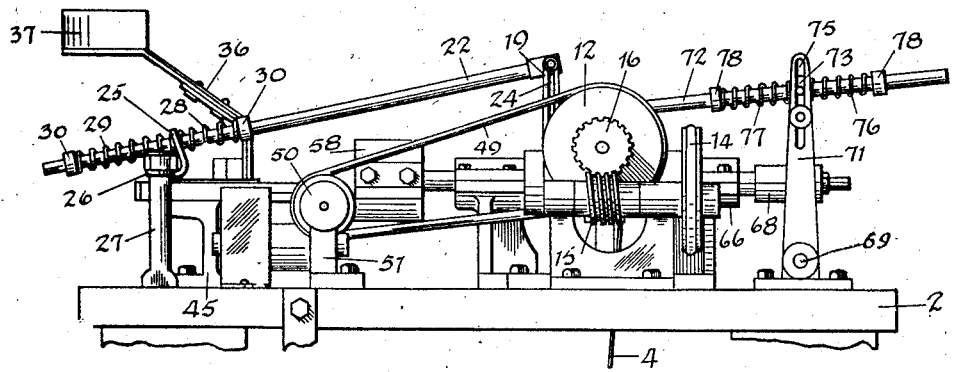
Figure 5:
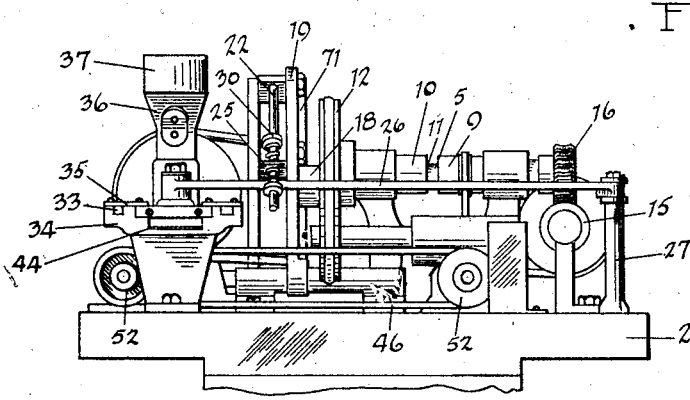

Figure 1 of the drawings is a view of the top of the machine selected for purposes of illustration. Fig. 2 is an illustration of a front view. Fig. 3 is an illustration of an end view. Fig. 4 is an illustration of a side view opposite to that shown in Fig. 2. Fig. 5 is an illustration of an end view opposite to that shown in Fig. 3. Fig. 6 is a sectional view taken on the line 6—6 indicated in Fig. 1. Fig. 7 is a sectional view taken on the line 7—7 indicated in Fig. 1. Fig. 8 is a sectional view of a gear mechanism for driving the taps. Fig. 9 is a sectional view of a jaw clutch taken on the plane of the line 9—9 indicated in Fig. 1. Fig. 10 is a perspective view of a controlling cam. Fig. 11 is a view of a section taken on the plane of the line 11—11 indicated in Fig. 6.

1, in certain of the figures, are legs or standards for supporting a table top or plate 2 of the machine, to which a large part of the mechanism is bolted. A treadle 3 is pivotally supported by the standards 1 and is connected by means of the link rod 4 to the mechanism located on the plate 2 whereby the mechanism may be controlled by the foot of the attendant or operator of the machine.

The link 4 controls a jaw clutch 5. It is connected to a bell crank lever 6 that is pivoted on a bracket 7. The lever 6 is pulled in one direction by the pedal operating through the link rod 4 and in the opposite direction by the spring 8. The movement caused by the pedal operates to connect the parts 9 and 10 of the jaw clutch, the lever 6 being connected to the part 9 at its forked end located in a suitable channel formed in the part 9 slides the part 9 into engagement with the part 10 of the jaw clutch. The part 9 is keyed to a shaft 11 while the part 10 is a sleeve that is connected to a cam 12. It also operates as a pulley wheel, as hereinafter described. The shaft 11 is continuously driven by means of the belts 13 and 14 and the worm gears 15 and 16, the belt 13 being driven by a suitable driving mechanism obtaining power from any suitable source.

When the jaw clutch parts are connected together the cam 12 is rotated to place the nuts to be tapped and the taps in operative relation. In the structure shown in the drawings the nuts are moved to the taps while the taps are being rotated. The cam is provided with a channel 17 in which is located a roller 18 that is connected to a lever 19. The lever 19 is pivotally supported by means of the shaft 21 in bearing brackets 20, that are secured to the plate 2. A rod 22 is pivotally connected to the lever 19 by means of a pin 23 located in a slot 24 formed in the free end of the lever 19. The slot provides adjustability of the rod 22 relative to the lever and thus provides a means whereby the extent of the movements of the rod 22 may be varied as desired.

The rod 22 extends through an ear 25 connected to or formed integral with a lever 26 to produce oscillatory movements in the lever 26.

The lever 26 is pivotally connected to a pedestal 27 that is secured to the bed or base plate 2. Compression springs 28 and 29 are located on opposite sides of the ear 25 and between adjustable rings 30, whereby the ear 25, and consequently the lever 26, are yieldingly held in their positions relative to the rod 22. The degree of the yieldment may be varied by varying the degree of compression of the springs 28 and 29 by varying the position of the rings 30 on the rod 22. The action of the lever 26 therefore is not positive, but the pressure transmitted through the springs to the lever 26 is sufficiently great to cause the operation of the machine and yet prevent jamming of parts of the mechanism and greatly reduce breakage.

The lever 26 operates to move the nuts to the taps. Its free end is suitably slotted to permit the change from the angular movements of the lever to longitudinal movements of the nut carrying slide 31 to which it is connected by the pin 32. The slide 31 is guided in its longitudinal movements by means of the standard or pedestal 45. The edges of the slide are covered by the plates 35 (Fig. 5) so that the slide is securely but slidably held in position in the pedestal 45.

A hopper 36 is supported on the slide 31. The hopper is provided with the usual container 37 into which blanks may be inserted. A pair of chutes 38 communicate with the bottom of the hopper and guide the nuts to the slide 31. A guide plate 39 is located at an angle to the vertical and its lower edge is placed at a point slightly greater than the thickness of a blank from the bottom of the hopper, particularly where the chute communicates with the container 37. This causes the blanks placed in juxtaposition to the guide plate 39 and located on the bottom of the container to tip and work down to a position such that they will lie flat on the bottom of the container. The back and forth movements produced by the lever 26 and particularly those induced by any sudden releasement of either of the compression springs 28 and 29, causes the blanks to be shaken in the container 37 and to work into the chutes 38. Each return movement causes the blanks to move from the guide plate 39 and thus permits the blanks to work down into the proper position for delivery into the chutes and to finally work into the chutes, particularly at the end of the forward movements and at the beginning of the return movement by reason of the inertia of the blanks located at the upper ends of the chutes.

The blanks are delivered by the chute in position to be tapped. They are delivered in front of the tapping block 40 and between the tapping block 40 and the cover plate 41 having the holes 42, whereby the block and plate may pass over the taps 43. The location of the centers of holes 42 is at about the distance of one and one-half times the width of a blank above the top of releasing plate 44 which brings the second blank or nut from the lower edges of the plate and block in position to be tapped. The blanks are located in passageways that register with the ends of the chutes 38 and formed between the cover plate 41 and the hardened steel tapping block 40. When the slide is in its return position, the lower ends of the passageways are closed by an adjustable releasing plate 44 that is adjustably secured to a standard or pedestal 45 that may also be used to support in part the weight of the slide 31. When the slide is in its forward position, the lower nut or blank is dropped from the passageways since the slide is carried beyond the forward edge of the releasing plate 44, but the tap 43 has entered the hole of the succeeding nut in a tapping operation and consequently while the slide 31 is in the forward position the blanks are held in the chutes. As the nuts fall from the chutes in succession or in pairs they are conveyed away by a suitable slide or conveyor. In the structure shown they fall from the releasing plate on to a belt or conveyor 46 and are carried to a hooded opening 47 formed in the plate 2 through which they drop into a suitable receptacle, such as the box 48. The belt 46 is driven by a belt 49 that passes over the cam 12 and pulley 50 supported on a suitable shaft that is rotatably supported in the bracket 51 secured to the plate 2 and operates to drive through gears, the pulleys 52, one of which is supported by the bracket 51 and the other is supported by the bracket 53.

Thus the blanks are constantly vibrated or shaken so that they will be guided to the chutes without jamming and will be directed into the tapping position and pairs thereof delivered in succession from the machine.

The tapping blocks 40 are provided with large openings to prevent contact with the taps and to give free clearance for the shavings (Fig. 6). They are backed by removable soft steel inserts or blocks 75 that greatly extend the life of the machine. The taps 43 are secured in chucks 54 located on spindles 55. The spindles 55 are rotated by means of gear wheels 56 and the gear wheel 57 located in the gear box 58 that is connected to the ends of the guide bars 33.

The ends of the guide bars 33 may be provided with upturned flanges or plates 59 to form the sides of the gear box, or the gear box 58 may be bolted to the guide bars 33, and unitary rotation of the gear box and gears will be prevented by the guide bars 33 that are located in the slideways in the pedestal 45. The spindles 55 and the shaft 60 to which the gear wheel 57 is keyed are supported in ball bearings 61 to produce free rotation and to provide for the end thrust of the spindles 55 and of the shaft 60, whereby the taps are freely rotated with the loss of but little friction.

The shaft 60 is controlled to produce rotative movements of the spindles 55 first in one direction during the tapping operation, and then in the opposite direction to permit removal of the tap from the nuts. The first rotative motion is produced when the slide 31 is moved forward, and the reverse rotation is produced when the slide is returned. The rotative movements of the spindles 55 are therefore produced in synchronism with the sliding movements of the slide 31.

The shaft 60 is a jointed shaft to permit ready removal of the gear box in case of repairs, and is supported in suitable bearings located in the gear case and in a bracket 62. A double frustumal clutch member 63 is keyed to the shaft 60 and is located between two clutch members that may be formed integral with the pulleys 64 and 65 that are rotated in opposite directions by the belts 13 and 66. When, therefore, the clutch member 63 is moved so as to make contact with one of the coacting pulley wheels 64 the shaft 60, and consequently the spindles 55, will be rotated in one direction, namely in a right-hand direction, when the slide 31 is being moved towards the gear casing, that is, while the taps are threading the nuts. To withdraw the taps from the nuts the clutch member 63 is moved so as to frictionally engage the pulley 65, whereupon the shaft 60 will be rotated by the operation of the belt 66 in the reverse direction, which will permit the removal of the taps from the nuts. By thus connecting the shaft 60 through one or the other of the pulleys 64 and 65 the speed of the shaft may also be varied, that is, the speed of rotation during the tapping operation is preferably slower than the speed of rotation during the withdrawal of the taps from the nuts.

Endwise movement of the jointed shaft 60 is performed by the operation of the forked lever 67 (Fig. 7) which is connected to the shaft 60 through the sleeve 68. The sleeve 68 is provided with a pair of bosses or pins that protrude diametrically from the sleeve 68 that are engaged by the forked lever 67. The sleeve 68 may be provided with ball bearings for endwise and lateral thrust of the sleeve and the shaft. Thus the shaft, the gear box, and the taps are moved towards the right as shown in Figures 1, 2, 4 and 7 while the chute and tap blocks are moved to the left.

The forked lever 67 is keyed to a shaft 69 that is supported in bearings 70 located on the plate 2. A lever 71 is also keyed to the shaft 69 and is connected to a rod 72. The rod 72 is connected to the slotted lever 19 by a pin extending through the slot 24. The point of connection between the rod 72 and the lever 19 may thus be adjusted to obtain the desired movements of the rod 72 relative to the rod 22 that is connected at a point more remote from the axis of rotation of the arm 19. Thus movements of the forked lever 67 relative to the slide 31 which is actuated by the rod 22 may be adjusted, whereby a relatively small movement is produced in the clutch 63 and a more extensive movement is produced in the slide 31. This adjustment may be further refined by means of the block 73 through which the rod 72 extends, and which is adjustably secured by a screw 74 that passes through a slot 75 formed in the lever 71. The screw 74 may be adjusted along and secured at any desired point in the slot 75.

The rod 72 is connected to the block 73 through the compression springs 76 and 77 that are located between opposite sides of the block 73 and the adjustable rings 78. The rings 78 may be adjustably secured to the rod 72 at different points to vary the compression of the springs 76 and 77, and thus produce the desired degree of yieldment as between the operations of the rod 72 and the arm 71. This adjustment also regulates the pressure on the clutch 63 to permit the clutch to be released should the tapping mechanism be jammed in any way.

The rods 22 and 72 being connected on the same side of the axis of rotation of the arm 19, the clutch member 63 and the slide 31 that carries the blanks will thus be moved to the left at the same time, but the extent of their movements will vary according to the adjustments of the parts. When the lever 19 is moved to the left the friction member 63 frictionally connects with the pulley 64 which produces right-hand rotation in the taps and at the same time the slide 31 moves the blanks towards the taps and those that are in tapping position along the taps while the threading operations are being performed. When, therefore, the lever 19 is moved to the right the clutch member 63 is frictionally connected with the reverse pulley 65 which reverses the rotation of the taps and at the same time the slide 31 is drawn away from the taps at substantially the same rate that the threaded nuts would be moved along the taps by the rotation of the taps. The lever 19 is caused to move back and forth in its sequential operations by the cam 12 so that as long as the jaw clutch 5 connects the cam 12 with the drive the tapping operations are performed.

The releasement during the withdrawal of the slide 31 produces a quick movement of the container which is accentuated by the springs located on rods, that causes the shaking of the blanks. This also may be further enhanced by a sudden change in the path of the roller connected to the arm 19, that is, in the surface of the cam, such as at the points 79 that actuate the roller 18 when the taps have completed their operations and when the slide 31 has been completely withdrawn. In this way certainty of blank feeding is obtained by the chutes and jamming of the nuts at the mouth of the chutes is avoided. The chutes 38 and the container 37 are mounted on the slide which is connected to the pivoted arm 26, and the arm 19 which is operated by the cam 12 is connected to the arm 26 by the rod 22 and the springs 28 and 29. Thus the chute and the hopper are shaken upon the completion of the operations of the taps.

I claim:

1. In a nut tapping machine, a clutch, a pair of rotative members, means for rotating the members in opposite directions, a slide for receiving blanks, a tap, a member connected to the clutch and to the slide for moving the clutch and the slide in the same direction and to connect one or the other of the rotative members to the tap, a yielding member interconnecting the slide and the first named member.

2. In a nut tapping machine, a clutch, a pair of rotative members, means for rotating the members in opposite directions, a slide for receiving blanks, a tap, a member connected to the clutch and to the slide for moving the clutch and the slide in the same direction and to connect one or the other of the rotative members to the tap, a cam for operating the member.

3. In a nut tapping machine, a clutch, a pair of rotative members, means for rotating the members in opposite directions, a slide for receiving blanks, a tap, a member connected to the clutch and to the slide for moving the clutch and the slide in the same direction and to connect one or the other of the rotative members to the tap, a cam for operating the member, a driving means, a clutch for connecting the cam with the driving means.

4. In a nut tapping machine, a clutch, a pair of rotative members, means for rotating the members in opposite directions, a slide for receiving blanks, a pair of taps, a pair of gear wheels connected to the taps, a gear wheel connected to the clutch and meshing with the first-named gear wheels, a resilient means interconnecting the clutch and the slide for reciprocating the slide and moving the clutch to connect one or the other of the rotative members with the last-named gear wheel on the change of direction of the movement of the slide.

In testimony whereof, I have hereunto signed my name to this specification.

CHARLES E. ROSS.